United States Patent
Foo et al.

(10) Patent No.: US 8,982,965 B2
(45) Date of Patent: *Mar. 17, 2015

(54) FILTERING STRENGTH DETERMINATION METHOD, MOVING PICTURE CODING METHOD AND MOVING PICTURE DECODING METHOD

(75) Inventors: Teck Wee Foo, Singapore (SG); Chong Soon Lim, Singapore (SG); Sheng Mei Shen, Singapore (SG); Shinya Kadono, Nishinomiya (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 711 days.

This patent is subject to a terminal disclaimer.

(21) Appl. No.: 13/293,247

(22) Filed: Nov. 10, 2011

(65) Prior Publication Data

US 2012/0057076 A1  Mar. 8, 2012

Related U.S. Application Data

(63) Continuation of application No. 12/722,790, filed on Mar. 12, 2010, now Pat. No. 8,085,856, which is a continuation of application No. 12/003,484, filed on Dec. 26, 2007, now Pat. No. 7,782,963, which is a continuation of application No. 10/479,958, filed as application No. PCT/JP03/08070 on Jun. 26, 2003, now Pat. No. 7,372,905.

(30) Foreign Application Priority Data

Jul. 11, 2002 (JP) .................................. 2002-202796

(51) Int. Cl.
H04N 7/12 (2006.01)
G06K 9/36 (2006.01)
(Continued)

(52) U.S. Cl.
CPC ........... *H04N 19/577* (2014.11); *H04N 19/139* (2014.11); *H04N 19/159* (2014.11);
(Continued)

(58) Field of Classification Search
USPC ................. 348/699, 606–608, 614, 622, 627; 375/240.02, 240.27, 240.29, 240.18
See application file for complete search history.

(56) References Cited

U.S. PATENT DOCUMENTS

| | | | |
|---|---|---|---|
| 5,010,401 | A | 4/1991 | Murakami et al. |
| 5,202,764 | A | 4/1993 | Ida et al. |

(Continued)

FOREIGN PATENT DOCUMENTS

| | | |
|---|---|---|
| EP | 0 714 209 | 5/1996 |
| EP | 0 838 955 | 4/1998 |

(Continued)

OTHER PUBLICATIONS

European Office Action dated Feb. 24, 2014 in European Application No. 09 171 879.1.

(Continued)

*Primary Examiner* — Gims Philippe
(74) *Attorney, Agent, or Firm* — Wenderoth, Lind & Ponack, L.L.P.

(57) ABSTRACT

A moving picture coding apparatus includes an inter-pixel filter having filters for filtering decoded image data so as to remove block distortion which is high frequency noise around block boundaries. The inter-pixel filter includes filters having different filtering strengths. The coding apparatus also includes a filter processing control unit for determining a filtering strength of the inter-pixel filter.

1 Claim, 13 Drawing Sheets

(51) Int. Cl.

| | | |
|---|---|---|
| *H04N 19/577* | (2014.01) | |
| *H04N 19/139* | (2014.01) | |
| *H04N 19/159* | (2014.01) | |
| *H04N 19/176* | (2014.01) | |
| *H04N 19/172* | (2014.01) | |
| *H04N 19/134* | (2014.01) | |
| *H04N 19/61* | (2014.01) | |
| *H04N 19/117* | (2014.01) | |
| *H04N 19/136* | (2014.01) | |
| *H04N 19/14* | (2014.01) | |
| *H04N 19/157* | (2014.01) | |
| *H04N 19/18* | (2014.01) | |
| *H04N 19/82* | (2014.01) | |
| *H04N 19/527* | (2014.01) | |
| *H04N 19/86* | (2014.01) | |
| *H04N 19/90* | (2014.01) | |
| *H04N 19/573* | (2014.01) | |

(52) U.S. Cl.
CPC ........... *H04N19/176* (2014.11); *H04N 19/172* (2014.11); *H04N 19/134* (2014.11); *H04N 19/61* (2014.11); *H04N 19/117* (2014.11); *H04N 19/136* (2014.11); *H04N 19/14* (2014.11); *H04N 19/157* (2014.11); *H04N 19/18* (2014.11); *H04N 19/82* (2014.11); *H04N 19/527* (2014.11); *H04N 19/86* (2014.11); *H04N 19/90* (2014.11); *H04N 19/573* (2014.11)
USPC ................................ 375/240.29; 375/240.18

(56) References Cited

U.S. PATENT DOCUMENTS

| | | | | |
|---|---|---|---|---|
| 5,479,211 | A | 12/1995 | Fukuda | |
| 5,600,731 | A | 2/1997 | Sezan et al. | |
| 5,610,729 | A | 3/1997 | Nakajima | |
| 5,642,165 | A * | 6/1997 | Suzuki et al. | 375/240.02 |
| 6,069,670 | A | 5/2000 | Borer | |
| 6,122,442 | A | 9/2000 | Purcell et al. | |
| 6,356,592 | B1 | 3/2002 | Naito | |
| 6,360,024 | B1 | 3/2002 | Tan et al. | |
| 6,381,373 | B1 | 4/2002 | Suzuki et al. | |
| 6,456,328 | B1 * | 9/2002 | Okada | 348/699 |
| 6,753,865 | B1 | 6/2004 | Conklin | |
| 6,950,473 | B2 | 9/2005 | Kim et al. | |
| 7,031,393 | B2 | 4/2006 | Kondo et al. | |
| 7,177,358 | B2 | 2/2007 | Inomata et al. | |
| 7,613,240 | B2 | 11/2009 | Sun et al. | |
| 2006/0171472 | A1 | 8/2006 | Sun et al. | |
| 2007/0201564 | A1 * | 8/2007 | Joch et al. | 375/240.29 |

FOREIGN PATENT DOCUMENTS

| | | |
|---|---|---|
| JP | 5-505080 | 7/1993 |
| JP | 5-308823 | 11/1993 |
| JP | 7-236140 | 9/1995 |
| JP | 11-187400 | 7/1999 |
| JP | 2000-59769 | 2/2000 |
| JP | 2002-330436 | 11/2002 |
| JP | 2003-32685 | 1/2003 |
| JP | 2003-116132 | 4/2003 |
| TW | 373407 | 11/1999 |
| WO | 91/14340 | 9/1991 |

OTHER PUBLICATIONS

Wiegand, "Joint Working Draft (JWD 1) and Joint Test Model (JM 1) for JVT Video Codec Standard(s)", 1. JVT Meeting; 58. MPEG Meeting; May 12, 2001-Jun. 12, 2001; Pattaya, TH; (Joint Video Team of ISO/IEC JTC1/SC29/WG11 and ITU-T SG. 16), No. JVT-A003r1, Dec. 6, 2001, XP030005002, ISSN: 0000-0444.
Video Coding Experts Group (VCEG). H.26L Test Model Long Term No. 6 (TML-6) draft0. [online]. 2001. p. 1-36.
Shijun Sun et al. "Loop Filter with Skip Mode", ITU Telecommunications Standardization Sector Study Group 16, No. VCEG-M20, Mar. 27, 2001, pp. 1-8, XP002321426.
Supplemental European Search Report dated Apr. 10, 2007 issued in European Application No. 03749803.
Joint Video Team (JVT) of ISO/IEC MPEG and ITU-T VCEG, Joint Committee Draft (CD), May 10, 2002, JVT-C167, p. 58-63,99-106.
European Office Action issued Feb. 5, 2009 is corresponding European patent application No. 03749803.7.
Tien C-N; Hang H-M:"Transform-domain postprocessing of DCT-coded images", pp. 1627-1638.
Extended European Search Report issued Jul. 14, 2011 in European Patent Application No. 09 17 1879, which is a foreign counterpart of the present application.
Thomas Wiegand, "Draft ISO/IEC 14496-10: 2002 (E)", ITU Study Group 16—Video Coding Experts Group—ISO/IEC MPEG and ITU-T VCEG(ISO/IEC JTC1/SC29/WG11 and ITU-T SG16 Q6), 3$^{rd}$ Meeting, Fairfax, VA, USA, May 6-10, 2002, No. JVT-C167, May 10, 2002, XP030005278, pp. i-132.

* cited by examiner

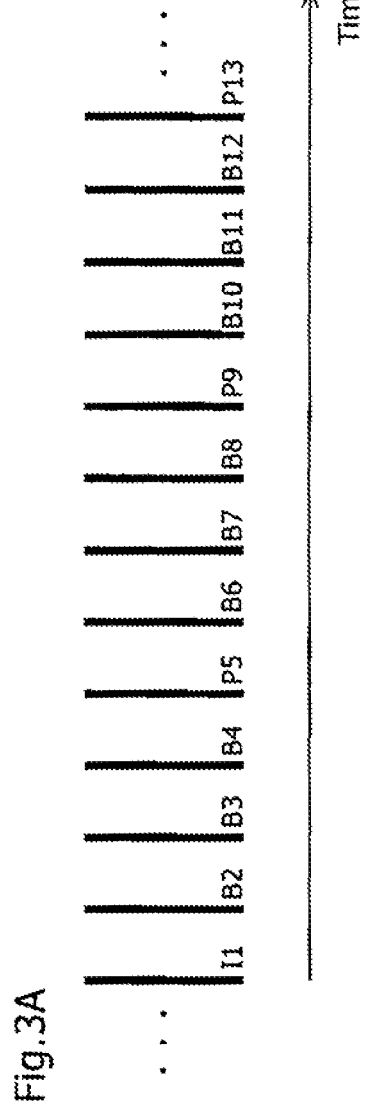
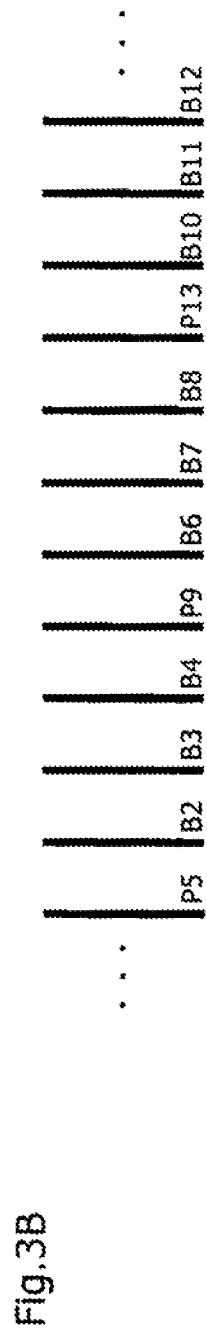
Fig.3A
Fig.3B

Fig.4

| | P5 | B6 | B7 | B8 | P9 |
|---|---|---|---|---|---|
| First reference index | 2 | 1 | 0 | | 3 |
| Second reference index | 3 | 2 | 1 | | 0 |

Current picture to be coded

→ Display order

FILTERING STRENGTH DETERMINATION METHOD, MOVING PICTURE CODING METHOD AND MOVING PICTURE DECODING METHOD

This application is a continuation application of application Ser. No. 12/722,790, filed Mar. 12, 2010 now U.S. Pat. No. 8,085,856, which is a continuation application of application Ser. No. 12/003,484, filed Dec. 26, 2007, now U.S. Pat. No. 7,782,963, which is a continuation application of application Ser. No. 10/479,958, filed Dec. 8, 2003, now U.S. Pat. No. 7,372,905 which is a National Stage Application of International Application No. PCT/JP03/08070 filed Jun. 26, 2003.

BACKGROUND OF THE INVENTION

1. Technical Field

The present invention relates to a filtering strength determination method for determining a strength of filtering to remove inter-block coding distortion, as well as to a moving picture coding method and a moving picture decoding method for applying filtering with a determined strength so as to code/decode a moving picture.

2. Background Art

A filter is used in video compression technique usually to improve picture quality as well as compression ratio. Blocky artifacts usually occur at decoded pictures of a low bit rate video compression due to quantization noise as well as motion compensation. One of the tasks of a filter is to smoothen the boundaries of blocks in the decoded pictures so that these blocky artifacts are reduced or removed.

Some video compression techniques, for example like the committee draft of ISO/IEC 14496-2 Part 10 which is under development, use loop filter to improve the compression of moving pictures (See Joint Video Team (JVT) of ISO/IEC MPEG and ITU-T VCEG Joint Committee Draft 2002-05-10, JVT-C167 9.5 Deblocking Filter, as an example). Loop filter is applied to both reference and non-reference pictures to improve the picture quality of the decoded pictures.

FIG. 1 shows the decision algorithm used in the committee draft of ISO/IEC 14496-2 Part 10 to select the strength of the filter to be used.

The decision is performed at the block boundary of two neighboring blocks p and q. First, a determination is performed on the blocks p and q to determine one of them is intra-coded or not (Step S102). If one of the blocks p and q is intra-coded (Yes in Step S102), a check is performed to see if the block boundary falls on a macroblock boundary (Step S103). If the result of the check shows that the block boundary falls on the macroblock boundary, that is, if the two blocks are not from the same macroblock, the strongest strength (Bs=4) will be selected (Yes in Step S103). If the result of the check shows that the block boundary does not fall on the macroblock boundary, that is, if these two blocks are from the same macroblock, the second strongest strength (Bs=3) will be selected (No in Step S103).

If the result of the check (Step S102) shows that both the blocks p and q are not intra-coded (No in Step S102), a check is then performed to see if any of the two blocks contain coefficients indicating spatial frequency components resulted from orthogonal transform (Step S104). If one of these two blocks contains coefficients (Yes in Step S104), the third strongest strength (Bs=2) will be selected. If neither of the two blocks contains coefficients, that is, if coefficients are not coded in both blocks p and q (No in Step S104), a decision will be made as follows to see if filtering is to be skipped or not (Step S105).

The reference picture index numbers for both blocks p and q, Ref(p) and Ref(q), will be checked to see if they are the same. Furthermore, vertical components (V(p,y) and (V(q,y)) and horizontal components (V(p,x) and (V(q,x)) of the motion vectors of the two blocks will also be compared with one another to see if there is a difference of less than one pixel. Only when the results of the above two checks show that the two blocks' reference picture index numbers are the same and their vertical and horizontal motion vectors are less than one pixel apart (No in Step S105), filtering of the boundary between these two blocks shall be skipped. In all other cases (Yes in Step S105), a weak filtering (Bs=1) shall be performed on the block boundary.

However, the decision algorithm in the prior art does not sufficiently cover all possible cases for blocks in a predictive-coded picture referring to two pictures. The reason is because macroblocks in a predictive-coded picture referring to two pictures can be predicted using direct, forward, backward modes, and a mode in which two pictures are referred to. These prediction modes have not been considered in the decision algorithm of the prior art. Similarly, in the case where one block uses direct mode and the other block uses a mode in which two pictures are referred to, motion vectors to be used for comparison have not been sufficiently described in the prior art.

SUMMARY OF THE INVENTION

The present invention has been conceived in view of the above problem, and it is an object of the present invention to provide a filtering strength determination method, as well as a moving picture coding method and a moving picture decoding method for determining an optimum filtering strength even when prediction coding employing two reference pictures is employed.

In order to achieve the above object, the filtering strength determination method according to the present invention is a filtering strength determination method for determining a strength of filtering to remove coding distortion between blocks that constitute a picture, comprising: a parameter obtainment step of obtaining parameters that are coding information regarding a coded current block and a coded neighboring block adjacent to said current block; a comparison step of making a comparison between the parameters of the current block and the neighboring block, when a picture including said current block and said neighboring block is a picture employing inter picture prediction coding using two reference pictures; and a determination step of determining a filtering strength, based on a comparison result obtained in the comparison step.

Here, the parameters may include coding mode information of the current block and the neighboring block, the comparison step may include a picture number judgment step of judging whether the number of reference pictures referred to by the current block and the number of reference pictures referred to by the neighboring block are the same or not, based on the respective coding mode information of the current block and the neighboring block, and the filtering strength which differs depending on a judgment result obtained in the picture number judgment step may be determined in the determination step.

Furthermore, the parameters may further include reference indices for uniquely identifying reference pictures, the comparison step may further include a reference picture judgment step of judging whether or not the current block and the neighboring block refer to a same reference picture, based on the respective reference indices of the current block and the neighboring block, and the filtering strength which differs depending on a judgment result obtained in the reference picture judgment step may be determined in the determination step.

Moreover, the parameters may include motion vectors with respect to a reference picture, the comparison step may further include a motion vector judgment step of judging whether or not at least one of the following differences is a predetermined value or larger, based on the motion vectors included in the current block and the neighboring block: a difference between a horizontal component of an arbitrary one of the motion vectors of the current block and a horizontal component of an arbitrary one of the motion vectors of the neighboring block; and a difference between a vertical component of an arbitrary one of the motion vectors of the current block and a vertical component of an arbitrary one of the motion vectors of the neighboring block, and the filtering strength which differs depending on a judgment result obtained in the motion vector judgment step may be determined in the determination step.

Accordingly, it becomes possible to sufficiently cover all possible cases for blocks in a predictive-coded picture referring to two pictures and to determine, in an optimum manner, a strength of a filter for removing block distortion (coding distortion between blocks) by filtering decoded image data so as to remove high frequency noise around block boundaries, even when prediction coding in which two pictures are referred to is employed. Moreover, this filtering strength determination method is applicable to both a moving picture coding apparatus and a moving picture decoding apparatus.

Also, the filtering strength determination method according to the present invention is a filtering strength determination method for determining a strength of filtering to remove coding distortion between blocks that constitute a picture, comprising: a parameter obtainment step of obtaining a picture type of a picture that includes a coded current block and a coded neighboring block adjacent to said current block; and a determination step of determining a stronger filtering strength than in a case where the picture type obtained in the parameter obtainment step indicates inter picture prediction coding using one reference picture, when said picture type indicates inter picture prediction coding using two reference pictures.

Accordingly, it becomes possible to determine, in an optimum manner, a strength of a filter for removing block distortion (coding distortion between blocks) by filtering decoded image data so as to remove high frequency noise around block boundaries, even when prediction coding in which two pictures are referred to is employed as in the above case. Moreover, this filtering strength determination method is applicable to both a moving picture coding apparatus and a moving picture decoding apparatus.

Furthermore, a moving picture coding method according to the present invention is a moving picture coding method for coding pictures making up a moving picture on a block-by-block basis, comprising: a filtering step of applying filtering on a boundary between the current block and the neighboring block by the use of a filtering strength determined using the filtering strength determination method according to the present invention.

Furthermore, a moving picture decoding method according to the present invention is a moving picture decoding method for decoding a coded moving picture in which pictures making up the moving picture have been coded on a block-by-block basis, comprising: a filtering step of applying filtering on a boundary between the current block and the neighboring block by the use of a filtering strength determined using the filtering strength determination method according to the present invention.

Note that the present invention can be realized not only as a filtering strength determination method, a moving picture coding method and a moving picture decoding method as described above, but also as a filtering strength determination apparatus. Additionally, the present invention can be realized by a moving picture coding apparatus and a moving picture decoding apparatus that have, as their steps, the characteristic steps included in the above filtering strength determination method, moving picture coding method and moving picture decoding method. The present invention can also be realized as a program that causes a computer to execute such steps. And it should be noted that such program can be distributed via recording media including CD-ROM and the like, and transmission media including the Internet and the like.

BRIEF DESCRIPTION OF DRAWINGS

FIG. 3 is a diagram explaining a picture order in a picture memory, wherein FIG. 3A shows an order in which pictures are inputted and FIG. 3B shows an order after the pictures are reordered.

FIG. 4 is a diagram explaining pictures and reference indices.

FIG. 9 is a diagram explaining a flexible disk which stores a moving picture coding method or a moving picture decoding method of the first and the second embodiments. FIG. 9B shows an external view of the flexible disk viewed from the front, a schematic cross-sectional view and the flexible disk, while

DETAILED DESCRIPTION OF THE INVENTION

The following explains embodiments of the present invention with reference to the figures.

Figure 2:
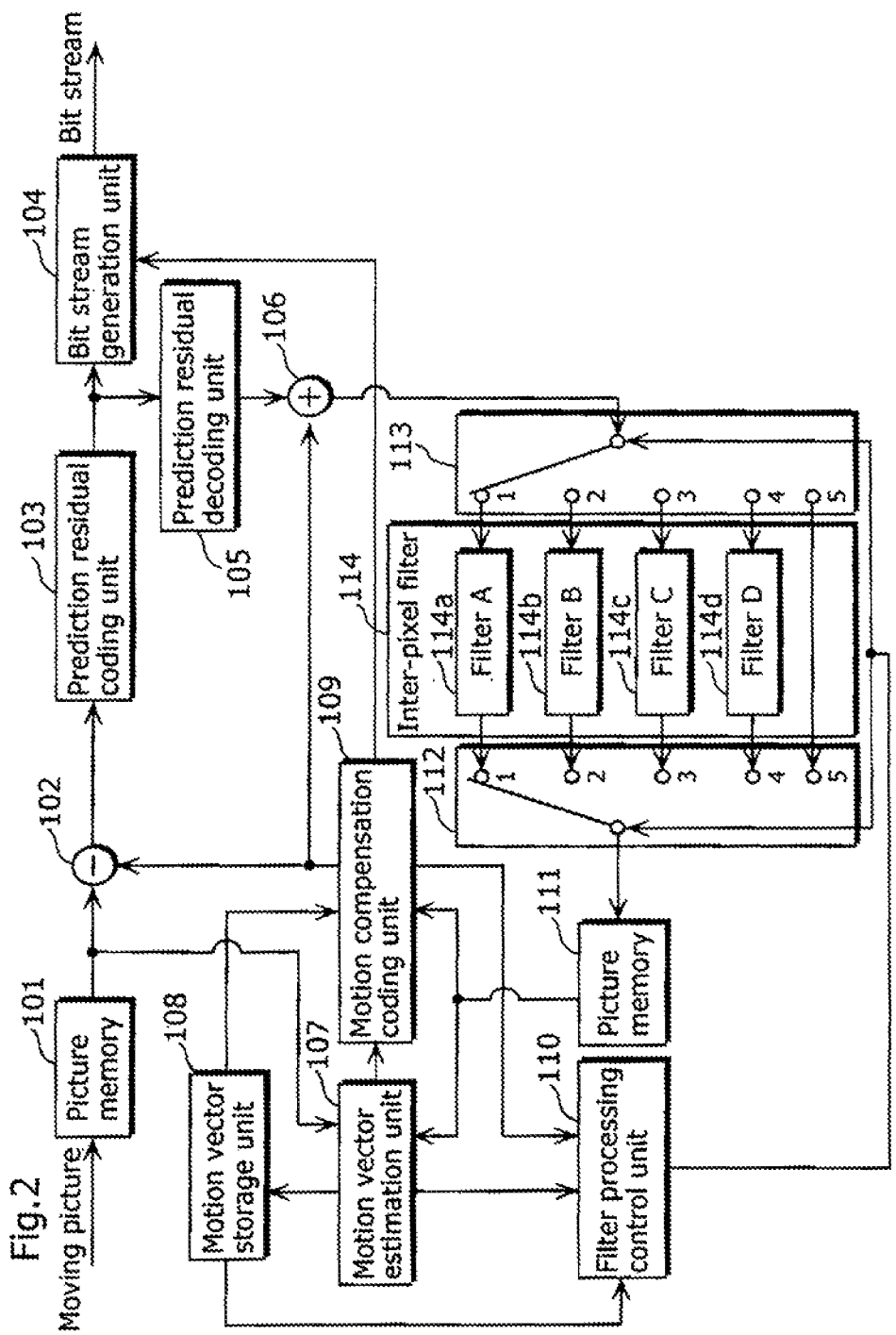
FIG. 2 is a block diagram showing a configuration of a moving picture coding apparatus according to the present invention.

FIG. 2 is a block diagram showing the configuration of a moving picture coding apparatus that employs a filtering strength determination method according to the present invention.

As shown in FIG. 2, this moving picture coding apparatus, which performs compression coding on an input moving picture and outputs it as a bit stream, is comprised of a picture memory 101, a difference calculation unit 102, a prediction residual coding unit 103, a bit stream generation unit 104, a prediction residual decoding unit 105, an adder 106, a motion vector estimation unit 107, a motion vector storage unit 108, a motion compensation coding unit 109, a filter processing control unit 110, a picture memory 111, switches 112 and 113, and an inter-pixel filter 114.

The picture memory 101 stores a moving picture which has been inputted in display order on a picture-by-picture basis. "Picture" here means a unit of coding so-called screen which includes a frame and fields. The motion vector estimation unit 107, using as a reference picture a picture which has been coded and decoded, estimates a motion vector indicating a position deemed most appropriate in a search area within the picture on a block-by-block basis. Furthermore, the motion vector estimation unit 107 notifies the estimated motion vector to the motion compensation coding unit 109 and the motion vector storage unit 108.

The motion compensation coding unit 109 determines, using the motion vector estimated by the motion vector estimation unit 107, a coding mode used for coding a block, and generates predictive image data on the basis of such coding mode. A coding mode, which is indicative of a method to be used for coding a macroblock, indicates which one of non-intra picture coding (motion compensated coding) and intra picture coding and the like should be performed on a macroblock. For example, when there is a weak correlation between pictures and therefore intra picture coding is more suitable than motion prediction, intra picture coding shall be selected. Such selected coding mode is notified to the filter control unit 110. The motion vector and the coding mode are notified from the motion compensation coding unit 109 to the bit stream generation unit 104. The motion vector storage unit 108 stores the motion vector estimated by the motion vector estimation unit 107.

The difference calculation unit 102 calculates the difference between a picture read out from the picture memory 101 and the predictive image data inputted by the motion compensation coding unit 109 so as to generate prediction residual image data. The prediction residual coding unit 103 performs coding processing such as orthogonal transform and quantization on the input prediction residual image data, and generates coded data. The bit stream generation unit 104 performs variable length coding and other processing on the coded data generated by the prediction residual coding unit 103, and generates a bit stream after adding, to such coded data, motion vector information and coding mode information and the like inputted by the motion compensation coding unit 109.

The prediction residual decoding unit 105 performs decoding processing such as inverse quantization and inverse orthogonal transform on the coded data so as to generate decoded differential image data. The adder 106 adds the decoded differential image data inputted by the prediction residual decoding unit 105 to the predictive image data inputted by the motion compensation coding unit 109 so as to generate decoded image data. The picture memory 111 stores the decoded image data to which filtering has been applied.

The filter processing control unit 110 selects a filtering strength of the inter-pixel filter 114 according to the input motion vector information and the coding mode information, i.e. selects which one of the following should be used: a filter A114a; a filter B114b; a filter C114c; a filter D114d; and no-filtering (skip), and controls the switch 112 and the switch 113. The switch 112 and the switch 113 are switches which selectively connect to one of their respective terminals "1"~"5" under the control of the filter processing control unit 110. The switch 113 is placed between the output terminal of the adder 106 and the input terminal of the inter-pixel filter 114. Meanwhile, the switch 112 is placed between the input terminal of the picture memory 111 and the output terminal of the inter-pixel filter 114.

The inter-pixel filter 114, which is a deblocking filter that filters decoded image data so as to remove block distortion which is high frequency noise around block boundaries, has the filter A114a, the filter B114b, the filter C114c, the filter D114d, each having a different filtering strength. Of these filters, the filter A114a is intended for the strongest filtering, the filter B114b for the second strongest, the filter C114c for the third strongest, and the filter D114d for the weakest filtering. Meanwhile, the amount of operation processing required for filtering depends on a filtering strength. Note that the switch 112, the switch 113 and other components illustrated in the diagram may be implemented either as hardware or software.

FIG. 3 is a diagram explaining a picture order in the picture memory 101, wherein FIG. 3A shows the order in which pictures are inputted and FIG. 3B shows the order after the pictures are reordered. In FIG. 3, vertical lines denote pictures, alphabets described in the lower right of the respective pictures denote picture types (I, P, or B), and numeric values subsequent to the alphabets denote picture numbers indicating the display order. Also, a P picture uses, as a reference picture, a forward I or P picture located in a close position in display order, while a B picture uses, as reference pictures, a forward I or P picture located in a close position in display order, and a single backward I or P picture located in a close position in display order.

FIG. 4 is a diagram explaining pictures and reference indices. "Reference indices", which are used to uniquely identify reference pictures stored in the picture memory 111, indicate numbers associated with each picture as shown in FIG. 4. The reference indices are also used to designate reference pictures to be used at the time of coding blocks by means of inter picture prediction.

As values of the first reference index, with respect to a current picture to be coded, "0" is assigned to a forward reference picture which is closest to the current picture in display order, and values starting from "1" are assigned to the other forward reference pictures. After values starting from "0" are assigned to all the forward reference pictures, the subsequent values are assigned to backward reference pictures, starting with a backward reference picture which is closest to the current picture.

As values of the second reference index, with respect to the current picture, "0" is assigned to a backward reference picture which is closest to the current picture in display order, and values starting from "1" are assigned to the other backward reference pictures. After values starting from "0" are assigned to all the backward reference pictures, the subsequent values are assigned to forward reference pictures, starting with a forward reference picture which is closest to the current picture.

For example, when the first reference index Ridx1 is "0" and the second reference index Ridx2 is "1" in FIG. 4, the forward reference picture is a B picture whose picture number is 7, and the backward reference picture is a P picture whose picture number is 9. "Picture number" here is a number indicating the display order. Note that a method for assigning reference indices shown in FIG. 3 is just an example method and therefore that another method is also applicable.

Next, an explanation is given of the operation of the moving to picture coding apparatus with the above configuration.

As illustrated in FIG. 3A, input picture data is inputted to the picture memory 101 in display order on a picture-by-picture basis. As shown in FIG. 3B, for example, the pictures inputted in the picture memory 101, after being determined their picture types for coding, will be sorted into an order in which coding shall be performed. This reordering into the order of picture coding is performed on the basis of a "reference relationship" among the pictures at the time of inter picture prediction coding. More specifically, reordering is performed in a manner in which a picture to be used as a reference picture comes before a picture which will use said picture as a reference picture so that the picture serving as a reference picture shall be coded before the picture that will use said picture as a reference picture. Note that as a method for determining picture types, a method in which picture types are periodically determined, for example, is usually employed.

The pictures reordered in the picture memory 101 are then read out on a macroblock basis. A macroblock is a group of pixels in the size of horizontal 16× vertical 16, for example. Meanwhile, motion compensation and the extraction of a motion vector are performed for each block which is a group of pixels in the size of horizontal 8× vertical 8, for example.

A current macroblock read out from the picture memory 101 is inputted to the motion vector estimation unit 107 and the difference calculation unit 102.

The motion vector estimation unit 107 performs vector estimation for each block in the macroblock, using the decoded image data stored in the picture memory 111 as a reference picture. Then, the motion vector estimation unit 107 outputs, to the motion compensation coding unit 109, the estimated motion vector and the reference index indicating a reference picture.

The motion compensation coding unit 109 determines a coding mode to be used for the macroblock, utilizing the estimated motion vector and the reference index from the motion vector estimation unit 107. Here, in a case of a B picture, for example, one of the following methods shall be selectable as a coding mode: intra picture coding; inter-picture prediction coding using a forward motion vector; inter-picture prediction coding using a backward motion vector; inter-picture prediction coding using two motion vectors; and direct mode.

Figure 5:
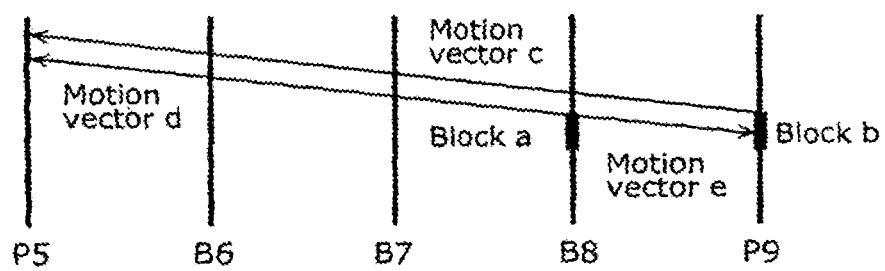
FIG. 5 is a diagram explaining motion vectors in direct mode.

Referring to FIG. 5, an explanation is given of an inter picture prediction method in direct mode. FIG. 5, which is a diagram explaining motion vectors in direct mode, illustrates a case where a block a in a picture B8 is coded in direct mode. In this case, a motion vector c of a block b, which is co-located with the block a, in a picture P9 that is a backward reference picture of the picture B8. This motion vector c, which is a motion vector used at the time of coding the block b, refers to a picture P5. Motion compensation is performed on the block a with reference to the picture P5 and the picture P9, using (i) a motion vector d, which is obtained by scaling the motion vector c, of the picture P5 that is a forward reference picture, and (ii) a motion vector e of the picture P9 that is a backward reference picture.

The motion compensation coding unit 109 generates predictive image data according to the above-determined coding mode, and outputs such predictive image data to the difference calculation unit 102 and the adder 106. Note that since a motion vector of a block, which is co-located with a current block, in a backward reference picture is used as a reference motion vector as described above when the motion compensation coding unit 109 selects direct mode, such reference motion vector and its reference index are read out from the motion vector storage unit 108. Also note that when the motion compensation coding unit 109 selects intra picture coding, no predictive image data is outputted. Furthermore, the motion compensation coding unit 109 outputs the determined coding modes, the motion vector and reference index information to the filter processing control unit 110 and the bit stream generation unit 104, and outputs reference index values indicating reference pictures to the filter processing control unit 110.

The difference calculation unit 102, which has received the predictive image data from the motion compensation coding unit 109, calculates the difference between such predictive image data and image data corresponding to a macroblock of the picture B11 read out from the picture memory 101 so as to generate prediction residual image data, and outputs it to the prediction residual coding unit 103.

The prediction residual coding unit 103, which has received the prediction residual image data, performs coding processing such as orthogonal transform and quantization on such prediction residual image data so as to generate coded data, and outputs it to the bit stream generation unit 104 and the prediction residual decoding unit 105. The bit stream generation unit 104, which has received the coded data, performs variable length coding and the like on such coded data and adds, to such input coded data, the motion vector information, the coding mode information and the like inputted by the motion compensation coding unit 109 so as to generate and output a bit stream. Note that when macroblocks are coded in direct mode, motion vector information is not to be added to a bit stream.

The prediction residual decoding unit 105 performs decoding processing such as inverse quantization and inverse orthogonal transform on the input coded data so as to generate decoded differential image data, and outputs it to the adder 106. The adder 106 adds the decoded differential image data to the predictive image data inputted by the motion compensation coding unit 109 so as to generate decoded image data, and outputs it to the inter-pixel filter 114 via the switch 113.

The inter-pixel filter 114, which has received the decoded image data, applies filtering on such decoded image data using one of the following filters selected by the switch 112 and the switch 113: the filter A114a; the filter B114b; the filter C114c; and the filter D114d. Or, the inter-pixel filter 114 stores the decoded image data in the picture memory 111 via the switch 112 without performing filtering (skip). When this is done, the switching of the terminals "1"~"5" of each of the switch 112 and the switch 113 is controlled by the filter processing control unit 110 in a manner described below.

Figure 6:
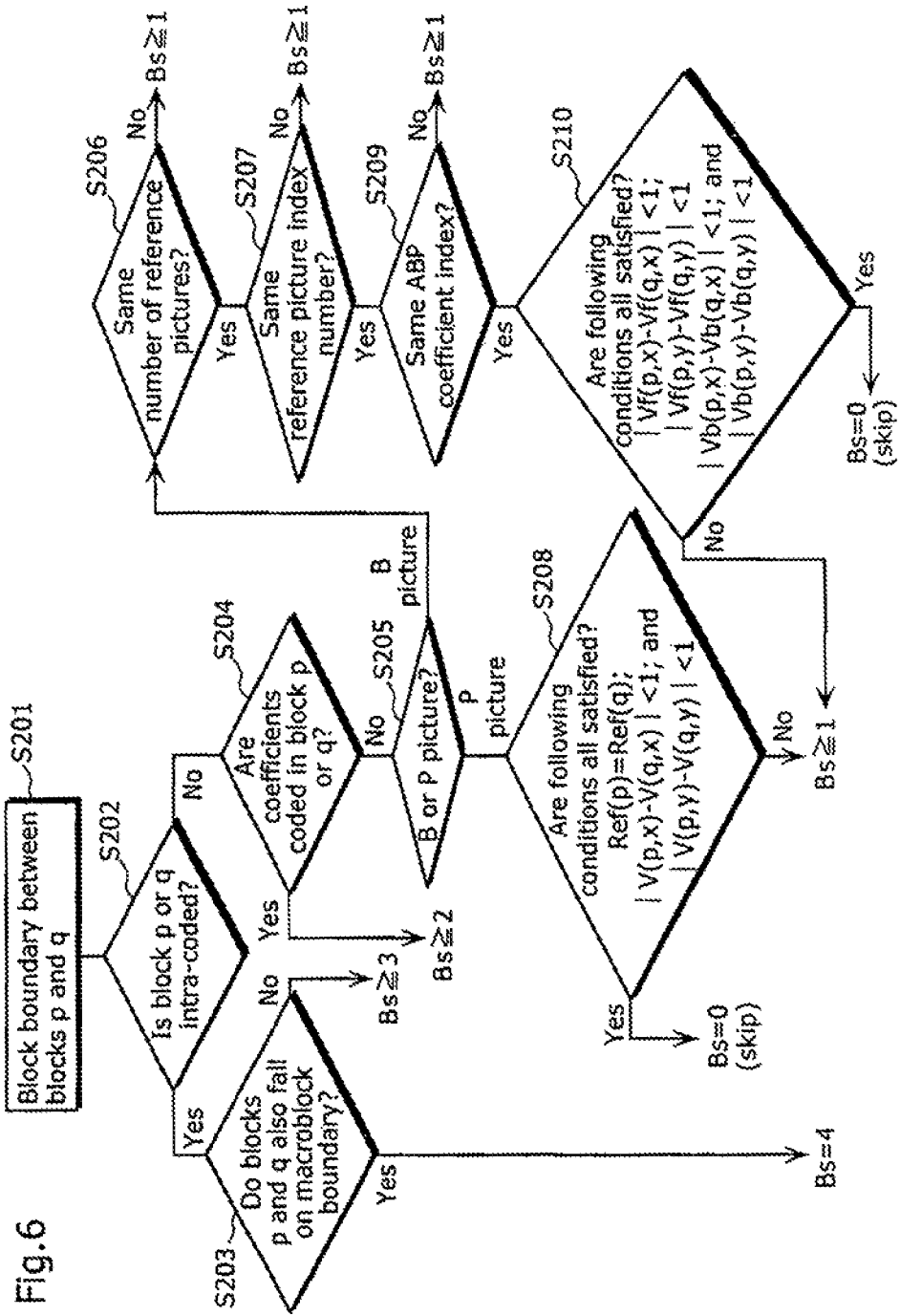
FIG. 6 is a flowchart showing a filtering strength determination method in a filter processing control unit according to the first embodiment.

FIG. 6 is a flowchart illustrating how a filtering strength is determined by the filter processing control unit 110.

Figure 1:
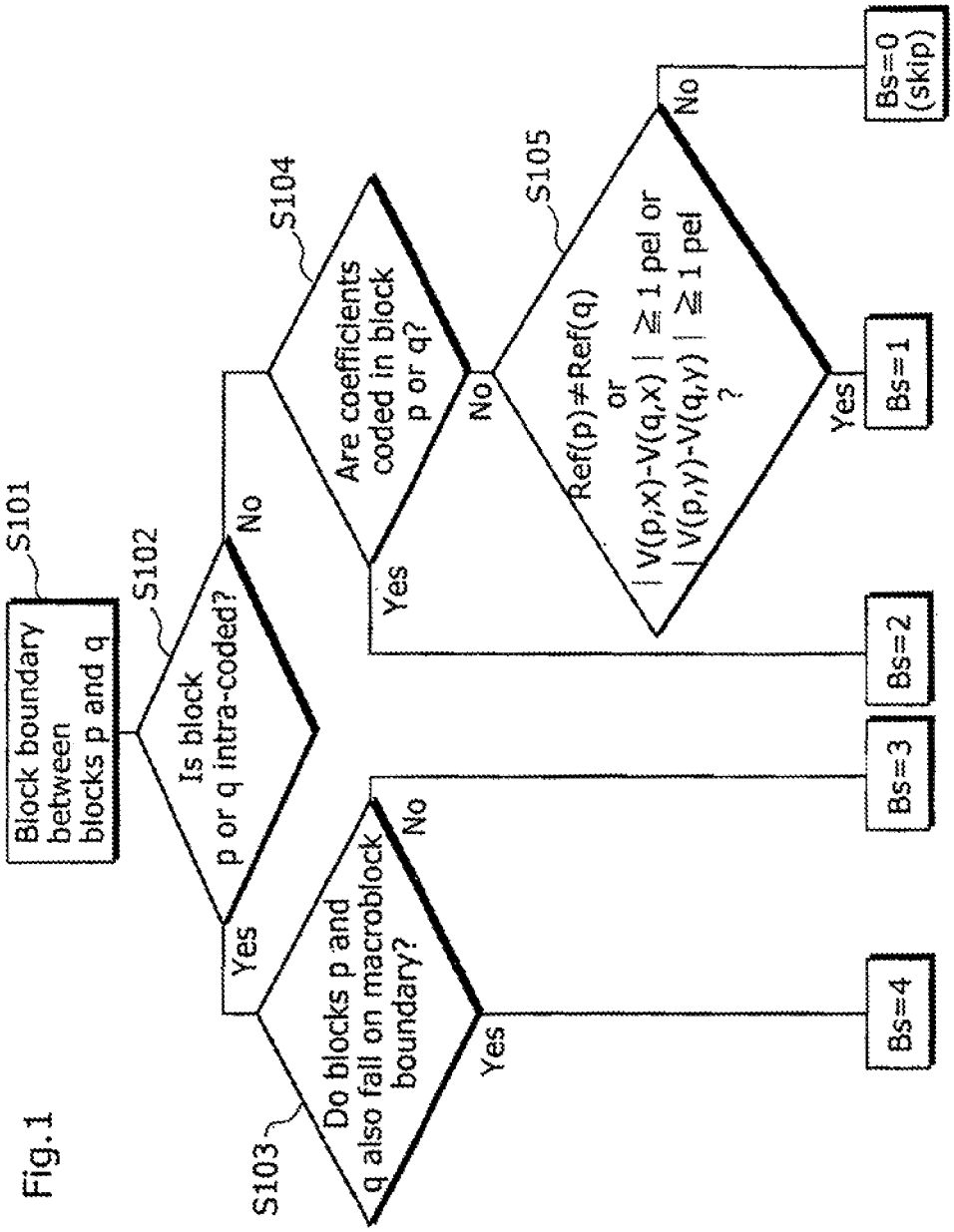
FIG. 1 is a flowchart showing an existing filtering strength determination method.

The filter processing control unit 110 determines filtering strengths required for block boundaries in both vertical and horizontal directions of the decoded image data. A determination for selecting a filtering strength used for filtering is made at the boundary of the two adjacent blocks p and q, as in the case of the prior art illustrated in FIG. 1 (Step S201). First, the filter processing control unit 110 checks to see if the blocks p and q are intra-picture-coded, on the basis of the coding mode of each macroblock outputted by the motion compensation coding unit 109 (Step S202). If one of these blocks is intra-coded (Yes in Step S202), the filter processing control unit 110 checks to see if the block boundary falls on a macroblock boundary (Step S203).

If the result of the check shows that the block boundary falls on the macroblock boundary, that is, if the two blocks are not from the same macroblock, the filter processing control unit 110 selects the filter A114a (Bs=4) with the strongest filtering strength (Yes in Step S203). To put it another way, the filter processing control unit 110 exerts control for switching a terminal of the switch 112 and a terminal of the switch 113 to "1", respectively. If the result of the check shows that the block boundary does not fall on the macroblock boundary, that is, if these two blocks are from the same macroblock, the filter processing control unit 110 selects the filter B114b (Bs≥3) with the second strongest strength (No in Step S203). To put it another way, the filter processing control unit 110 exerts control for switching a terminal of the switch 112 and a terminal of the switch 113 to "2", respectively. Note that Bs≥3 here indicates that Bs is 3 or a larger value at least under the conditions illustrated in this flowchart, and whether Bs is Bs=3 or a value larger than 3 shall be determined by other conditions not disclosed here. In the following, an equation that includes this inequality sign shall indicate a value range which can be determined by the conditions not disclosed in the present invention.

If the result of the check (Step S202) shows that neither of the blocks p nor q is intra-coded (No in Step S202), the filter processing control unit 110 checks to see if any of the two blocks p and q contains coefficients indicating spatial frequency components resulted from orthogonal transform (Step S204). If one of these blocks contains coefficients (Yes in Step S204), the filter processing control unit 110 selects the filter C114c (Bs≥2) with the third strongest strength. To put it another way, the filter processing control unit 110 exerts control for switching a terminal of the switch 112 and a terminal of the switch 113 to "3", respectively.

If neither of the two blocks contains coefficients, that is, if coefficients are not coded in both blocks p and q (No in Step S204), the filter processing control unit 110 checks to see if the picture that includes the blocks p and q is a P picture or a B picture (Step S205). If the picture that includes the blocks p and q is a P picture, the filter processing control unit 110 checks to see if (i) the blocks p and q refer to the same reference picture and (ii) each difference between vertical components (V(p,y) and (V(q,y)) and horizontal components (V(p,x) and (V(q,x)) of the motion vectors of the respective blocks p and q is less than one pixel (Step S208), on the basis of the reference index values inputted by the motion compensation coding unit 109 and the motion vectors inputted by the motion vector storage unit 108. In other words, the filter processing control unit 110 checks if the following equations (A), (B) and (C) are all satisfied or not:

$$Ref(p)=Ref(q) \qquad (A)$$

$$|V(p,x)-V(q,x)|<1 \qquad (B)$$

$$|V(p,y)-V(q,y)|<1 \qquad (C)$$

Ref(p) and Ref(q) here denote reference pictures referred to by the block p and the block q.

If the result of the check shows that the blocks p and q refer to the same reference picture and that each difference between vertical and horizontal motion vectors of the blocks p and q is less than one pixel (Yes in Step S208), the filter processing control unit 110 selects no-filtering (Bs=0). To put it another way, the filter processing control unit 110 exerts control for switching a terminal of the switch 112 and a terminal of the switch 113 to "5", respectively. In the other case (No in Step S208), the filter processing control unit 110 selects the filter D114d (Bs≥1) with the weakest filtering strength. To put it another way, the filter processing control unit 110 exerts control for switching a terminal of the switch 112 and a terminal of the switch 113 to "4", respectively.

If the result of the check (Step S205) shows that the picture that includes the blocks p and q is a B picture, a coding mode used for coding a macroblock shall be one of the following: inter-picture prediction coding using a forward motion vector; inter-picture prediction coding using a backward motion vector; inter-picture prediction coding using two motion vectors; and direct mode. For example, when the block p uses only forward prediction and the block q uses prediction using two reference pictures, the number of reference pictures used by the block p is "1", whereas the number of reference pictures used by the block q is "2". Thus, the filter processing control unit 110 checks to see if the number of reference pictures referred to by the block p and the number of reference pictures referred to by the block q are the same (Step S206). If the result of the check shows that the blocks p and q refer to a different number of reference pictures (No in Step S206), the filter processing control unit 110 selects the filter D114d (Bs≥1) with the weakest filtering strength.

On the other hand, when the blocks p and q refer to the same number of reference pictures (Yes in Step S206), the filter processing control unit 110 checks to see if the blocks p and q use exactly the same reference picture(s), on the basis of the reference index values inputted from the motion compensation coding unit 109 (Step S207). If the result of the check shows that any of the reference pictures referred to by the blocks p and q differs (No in Step S207), the filter processing control unit 110 selects the filter D114d (Bs≥1) with the weakest filtering strength.

Meanwhile, if the reference picture(s) referred to by the blocks p and q is/are exactly the same (Yes in Step S207), the filter processing control unit 110 checks to see if the weighting (ABP) coefficients for weighted prediction in the blocks p and q are the same (Step S209). If the result of the check shows that the ABP coefficients of the respective blocks p and q differ (No in Step S209), the filter processing control unit 110 selects the filter D114d (Bs≥1) with the weakest filtering strength. "Weighted prediction" here is a prediction method in which a value obtained by multiplying a pixel value in a reference picture by the first weighting coefficients α and further by adding the second weighting coefficients β to a result of such multiplication, serves as a predicted pixel value in inter picture prediction.

On the other hand, if the ABP coefficients of the blocks p and q are the same (Yes in Step S209), the filter processing control unit 110 checks to see if each difference between all of the vertical and horizontal motion vectors of the blocks p and q are less than one pixel (Step S210). In other words, the filter processing control unit 110 checks if the following equations (D)~(G) are all satisfied or not:

$$|Vf(p,x)-Vf(q,x)|<1 \qquad (D)$$

$$|Vf(p,y)-Vf(q,y)|<1 \qquad (E)$$

$$|Vb(p,x)-Vb(q,x)|<1 \qquad (F)$$

$$|Vb(p,y)-Vb(q,y)|<1 \qquad (G)$$

Here, Vf and Vb denote motion vectors in the respective blocks p and q, and there is only one of Vf and Vb when only one reference picture is used.

If the result of the check shows that each difference between all of the vertical and horizontal motion vectors of the blocks p and q is less than one pixel (Yes in Step S210), the filter processing control unit 110 selects no-filtering (Bs=0). In the other case (No in Step S210), the filter processing control unit 110 selects the filter D114d (Bs≥1) with the weakest filtering strength.

Note that it is possible to make a prediction on the macroblocks of a B picture using direct mode as described above. When direct mode is employed, motion vectors of a current block are derived from the motion vector of a block, in a reference picture whose second reference index Ridx2 is "0", which is co-located with the current block. In this case, a forward reference picture of the current block is a reference picture to be referred to by the motion vector of the corresponding block, and a backward reference picture of the current block is a reference picture whose second reference index Ridx2 is "0". Subsequently, the filter processing control unit 110 utilizes such derived motion vectors and the reference picture to determine a filtering strength.

As described above, when the picture that includes the blocks p and q is a B picture, since a check is made to see if the number of reference pictures referred to by the block p and the number of reference pictures referred to by the block q are the same, and if exactly the same reference picture(s) is/are used or not, it is possible to select an optimum filtering strength even when prediction coding in which two pictures are referred to is employed. This makes it possible for moving pictures to be coded in a manner which allows the improvement in the quality of such moving pictures to be decoded.

Figure 7:
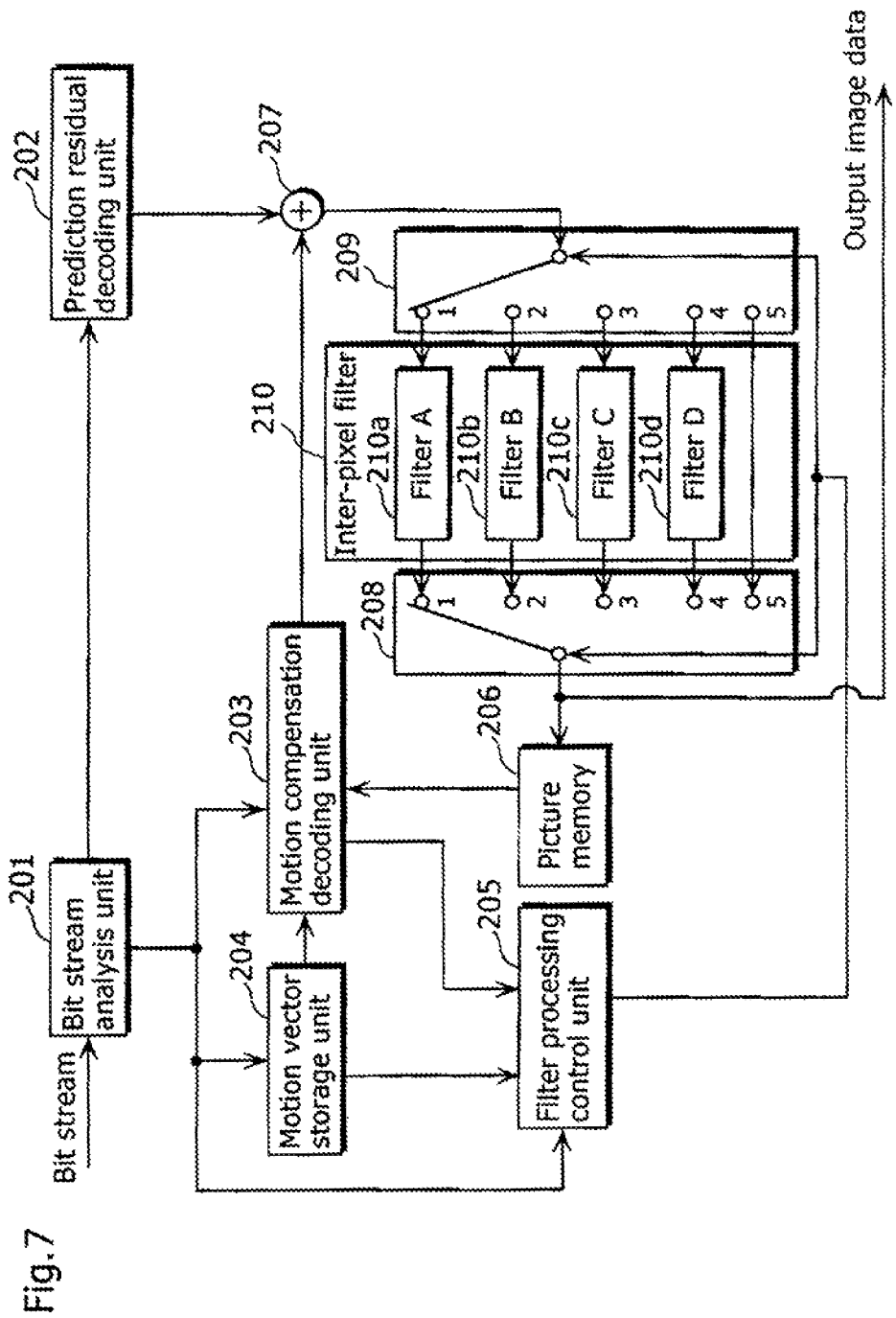
FIG. 7 is a block diagram showing a configuration of a moving picture decoding apparatus according to the present invention.

FIG. 7 is a block diagram showing a moving picture decoding apparatus that utilizes the filtering strength determination method according to the present invention.

As shown in FIG. 7, this moving picture decoding apparatus, which is an apparatus for decoding a bit stream coded by the moving picture coding apparatus, is comprised of a bit stream analysis unit 201, a prediction residual decoding unit 202, a motion compensation decoding unit 203, a motion vector storage unit 204, a filter processing control unit 205, a picture memory 206, an adder 207, switches 208 and 209, and an inter-pixel filter 210.

The bit stream analysis unit 201 extracts, from the input bit stream, various data including the coding mode information and the information indicating the motion vectors used for coding. The prediction residual decoding unit 202 decodes the input prediction residual coded data so as to generate the prediction residual image data. The motion compensation decoding unit 203 obtains image data from reference pictures stored in the picture memory 206 so as to generate motion compensated image data, on the basis of the coding mode information at the time of coding, the motion vector information and the like. The motion vector storage unit 204 stores the motion vectors extracted by the bit stream analysis unit 201. The adder 207 adds the prediction residual image data inputted by the prediction residual decoding unit 202 to the motion compensated image data inputted by the motion compensation decoding unit 203 so as to generate decoded image data. The picture memory 206 stores the decoded image data for which filtering has been applied.

The filter processing control unit 205 selects a filtering strength of the inter-pixel filter 210, i.e. selects one of a filter A210a, a filter B210b, a filter C210c, a filter D210d, and no-filtering (skip), and controls the switch 208 and the switch 209. The switch 208 and the switch 209 are switches which selectively connect to one of their respective terminals "1"~"5" under the control of the filter processing control unit 205. The switch 209 is placed between the output terminal of the adder 207 and the input terminal of the inter-pixel filter 210. Meanwhile, the switch 208 is placed between the input terminal of the picture memory 206 and the output terminal of the inter-pixel filter 210.

The inter-pixel filter 210, which is a deblocking filter that filters decoded image data so as to remove block distortion which is high frequency noise around block boundaries, has the filter A210a, the filter B210b, the filter C210c, the filter D210d, each having a different filtering strength. Of these filters, the filter A210a is indented for the strongest filtering, the filter B210b for the second strongest, the filter C210c for the third strongest, and the filter D210d for the weakest filtering. Meanwhile, the amount of operation required for filtering depends on a filtering strength.

Next, an explanation is given of the moving picture decoding apparatus with the above configuration. The bit stream analysis unit 201 extracts, from the input bit stream, various data including the coding mode information and the motion vector information. The bit stream analysis unit 201 outputs the extracted coding mode information to the motion compensation decoding unit 203 and the filter processing control unit 205, and outputs the motion vector information and the reference indices to the motion vector storage unit 204. Furthermore, the bit stream analysis unit 201 outputs the extracted prediction residual coded data to the prediction residual decoding unit 202. The prediction residual decoding unit 202, which has received such prediction residual coded data, decodes the prediction residual coded data so as to generate the prediction residual image data, and outputs it to the adder 207.

The motion compensation decoding unit 203 generates the motion compensated image data, referring to the reference pictures stored in the picture memory 206, on the basis of the coding mode information and the reference index values inputted by the bit stream analysis unit 201, and the motion vector information read out from the motion vector storage unit 204. Then, the motion compensation decoding unit 203 outputs the generated motion compensated image data to the adder 207, and outputs the reference index values indicating reference pictures to the filter processing control unit 205. The adder 207 adds the motion compensated image data to the prediction residual image data inputted by the prediction residual decoding unit 202 so as to generate decoded image data, and outputs it to the inter-pixel filter 210 via the switch 209.

The inter-pixel filter 210, which has received the decoded image data, applies filtering on such decoded image data using one of the following filters selected by the switch 208 and the switch 209: the filter A210a; the filter B210b; the filter C210c; and the filter D210d. Or, the inter-pixel filter 210 stores the decoded image data in the picture memory 206 via the switch 208 without performing filtering (skip). When this is done, the switching of the terminals "1"~"5" of each of the switch 208 and the switch 209 is controlled by the filter processing control unit 205 in an equivalent manner to that of the aforementioned filter processing control unit 110 of the moving picture coding apparatus.

As described above, when the picture that includes the blocks p and q is a B picture, since a check is made to see if the number of reference pictures referred to by the block p and the number of reference pictures referred to by the block q are the same, and if reference picture(s) to be referred to is/are exactly the same or not, it is possible to select an optimum filtering strength even when prediction coding in which two pictures are referred to is employed. This makes it possible for moving pictures to be decoded in a manner which allows the improvement in the quality of such moving pictures.

Second Embodiment

The second embodiment presents a filtering strength determination method which is partly different from one employed by the filter processing control unit 110 explained in the first embodiment. Note that the configuration required for the method according to the present embodiment is equivalent to that of the first embodiment, and therefore that detailed explanations thereof are omitted. Also note that an explanation is also omitted where a filtering strength is determined in the filter processing control unit 110 in the same manner as that of the first embodiment. It should be noted that the filtering strength determination method of the filter processing control unit 205 is applicable to the present embodiment regarding a moving picture decoding apparatus.

Figure 8:
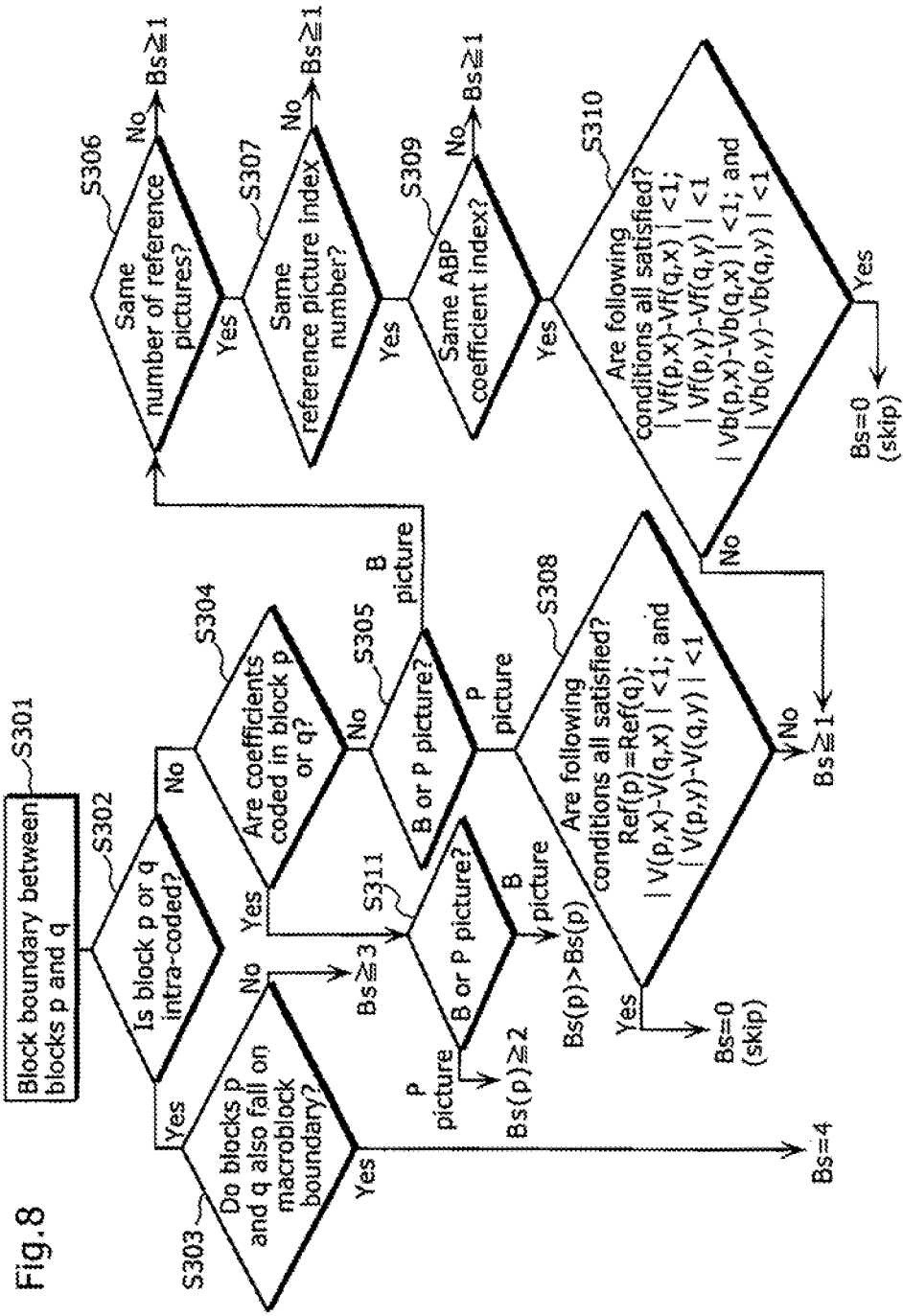
FIG. 8 is a flowchart showing a filtering strength determination method in a filter processing control unit according to the second embodiment.

FIG. 8 is a flowchart illustrating a filtering strength determination method according to the second embodiment.

If the result of a check (Step S304) performed by the filter processing control unit 110 to see whether any of the two blocks p and q contains coefficients indicating spatial frequency components resulted from orthogonal transform, shows that one of these blocks contains coefficients (Yes in Step S304), the filter processing control unit 110 performs processing described below.

The filter processing control unit 110 checks to see if the picture that includes the blocks p and q is a P picture or a B picture (Step S311). If the picture that includes the blocks p and q is a P picture, the filter processing control unit 110 selects the filter C114c (Bs(p)≥2) with the third strongest filtering strength. Meanwhile, if the picture that includes the blocks p and q is a B picture, the filter processing control unit 110 selects Bs(b) (Bs(b)>Bs(p)) with a stronger filtering strength than Bs(p) used for a P picture.

As described above, when any of the blocks p and q contains coefficients indicating spatial frequency components resulted from orthogonal transform, since a check is made to see if the picture that includes these blocks p and q is a P picture or a B picture, it is possible to select an optimum filtering strength even when prediction coding in which two pictures are referred to is employed. This makes it possible for moving pictures to be coded in a manner which allows the improvement in the quality of such moving pictures to be decoded.

Note that when the filter processing control unit 110 selects no-filtering (Bs=0) in the above embodiments, it is possible that a filter with a weaker strength than the filter D114d (Bs≥1) with the weakest filtering strength may be used, instead of applying no filtering (skip).

Also note that the filter processing control unit 110 does not have to execute all steps illustrated in the flowchart of FIG. 5 or FIG. 8 in the above embodiments and therefore that processing of these steps may be partially omitted. For example, although the filter processing control unit 110 performs check processing of Step S209 (S309) when the result of a check performed in Step S207 (S307) shows that the blocks p and q refer to exactly the same reference picture(s) (Yes in Step S207 (S307)), it is also possible that check processing of Step S210 (S310) may be performed instead. Moreover, the execution order of each step may be transposed.

Furthermore, although coding is performed on a picture-by-picture basis in the above embodiments, a field or a frame may also serve as a unit of coding.

Third Embodiment

If a program for realizing the configuration of the moving picture coding method or the moving picture decoding method as shown in each of the aforementioned embodiments is recorded on a recording medium such as a flexible disk, it becomes possible to easily perform the processing presented in each of the aforementioned embodiments in an independent computer system.

FIG. 9 is a diagram explaining a recording medium which stores a program for realizing the moving picture coding method and the moving picture decoding method of the above embodiments in a computer system.

Figure 9A:
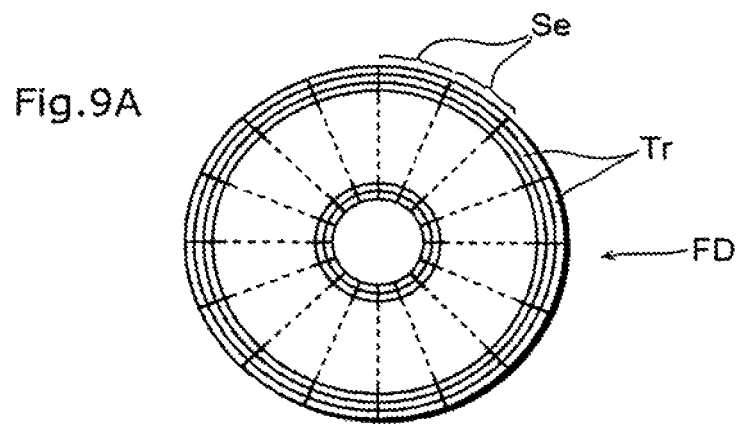
FIG. 9A illustrates an example physical format of the flexible disk as a recording medium itself.
Figure 9B:
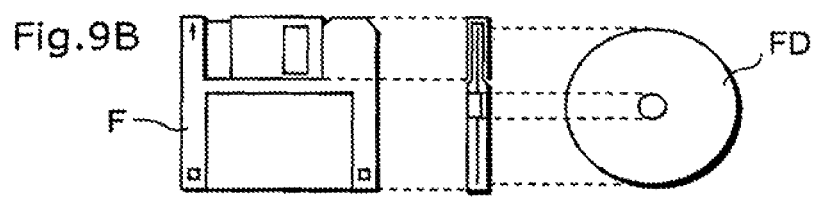

FIG. 9B shows an external view of the flexible disk viewed from the front, a schematic cross-sectional view and the flexible disk, while FIG. 9A illustrates an example physical format of the flexible disk as a recording medium itself. A flexible disk FD is contained in a case F, a plurality of tracks Tr are formed concentrically on the surface of the disk in the radius direction from the periphery, and each track is divided into 16 sectors Se in the angular direction. Therefore, in the flexible disk storing the above-mentioned program, the moving picture coding method as such program is recorded in an area allocated for it on the flexible disk FD.

Figure 9C:
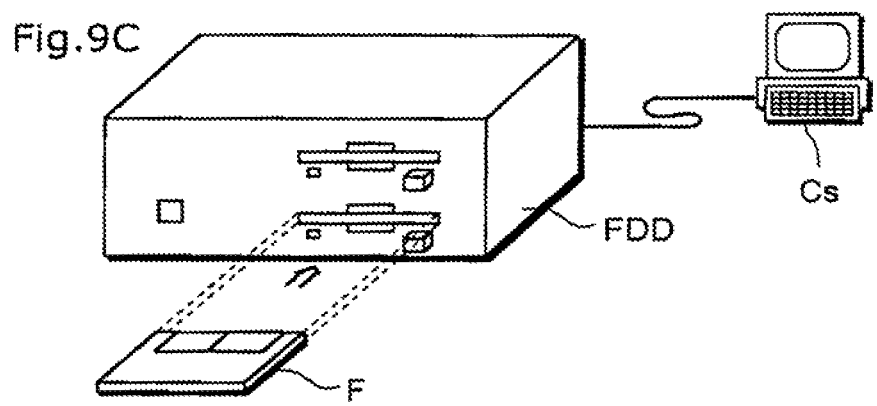
FIG. 9C shows a structure for recording and reading out the program on and from the flexible disk FD.

FIG. 9C shows the structure for recording and reading out the program on and from the flexible disk FD. When the program is recorded on the flexible disk FD, the computer system Cs writes the moving picture coding method or the moving picture decoding method as a program via a flexible disk drive FDD. When the moving picture coding method is constructed in the computer system by the program on the flexible disk, the program is read out from the flexible disk via the flexible disk drive and transferred to the computer system.

The above explanation is given on the assumption that a recording medium is a flexible disk, but the same processing can also be performed using an optical disc. In addition, the recording medium is not limited to a flexible disk and an optical disc and any other medium, such as an IC card and a ROM cassette, capable of recording a program can be used.

Following is the explanation of the applications of the moving picture coding method and the moving picture decoding method as shown in the above embodiments, and the system using them.

Figure 10:
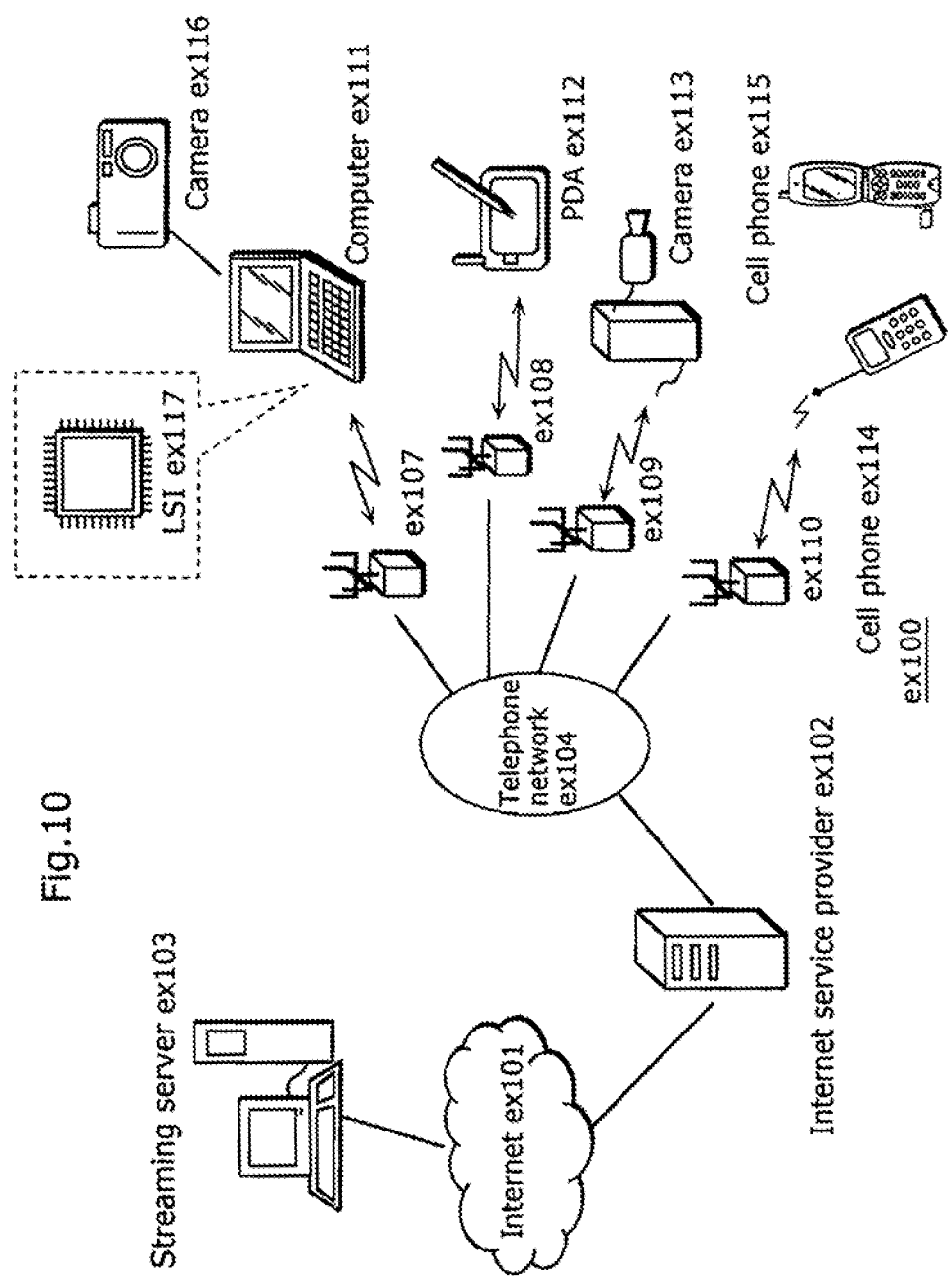
FIG. 10 is a block diagram showing an overall configuration of a content supply system for realizing a content distribution service.

FIG. 10 is a block diagram showing the overall configuration of a content supply system ex100 for realizing a content distribution service. The area for providing communication service is divided into cells of desired size, and base stations ex107~ex110 which are fixed wireless stations are placed in respective cells.

In this content supply system ex100, a computer ex111, a PDA (Personal Digital Assistant) ex112, a camera ex113, a cell phone ex114, and a camera-equipped cell phone ex115 are connected to the Internet ex101 via an Internet service provider ex102, a telephone network ex104 and the base stations ex107~ex110.

However, the content supply system ex100 is not limited to the configuration as shown in FIG. 10, and may be connected to a combination of any of them. Also, each device may be connected directly to the telephone network ex104, not through the base stations ex107~ex110 which are fixed wireless stations.

The camera ex113 is a device such as a digital video camera capable of shooting moving pictures. The cell phone may be a cell phone of a PDC (Personal Digital Communication) system, a CDMA (Code Division Multiple Access) system, a W-CDMA (Wideband-Code Division Multiple Access) system or a GSM (Global System for Mobile Communications) system, a PHS (Personal Handyphone system) or the like.

A streaming server ex103 is connected to the camera ex113 via the base station ex109 and the telephone network ex104, which enables live distribution or the like using the camera ex113 based on coded data transmitted from the user using the camera ex113. Either the camera ex113 or the server and the like for carrying out data transmission may code the shot data. Also, moving picture data shot by a camera ex116 may be transmitted to the streaming server ex103 via the computer ex111. The camera ex116 is a device such as a digital camera capable of shooting still pictures and moving pictures. In this case, either the camera ex116 or the computer ex111 may code the moving picture data. An LSI ex117 included in the computer ex111 and the camera ex116 performs coding processing. Note that software for coding and decoding moving pictures may be integrated into a certain type of storage medium (such as a CD-ROM, a flexible disk and a hard disk) that is a recording medium readable by the computer ex111 or the like. Furthermore, the camera-equipped cell phone ex115 may transmit the moving picture data. This moving picture data is data coded by the LSI included in the cell phone ex115.

In the content supply system ex100, content (such as a music live video) shot by the user using the camera ex113, the camera ex116 or the like is coded in the same manner as the above-described embodiments and transmitted to the streaming server ex103, and the streaming server ex103 makes stream distribution of the content data to clients at their request. The clients include the computer ex111, the PDA ex112, the camera ex113, the cell phone ex114 and so on capable of decoding the above-mentioned coded data. The content supply system ex100 with the above structure is a system in which the clients can receive and reproduce the coded data, and can further receive, decode and reproduce the data in real time so as to realize personal broadcasting.

The moving picture coding apparatus and the moving picture decoding apparatus presented in the above embodiments may be employed as an encoder and a decoder in the devices making up such system.

As an example of such configuration, a cell phone is taken as an example.

Figure 11:
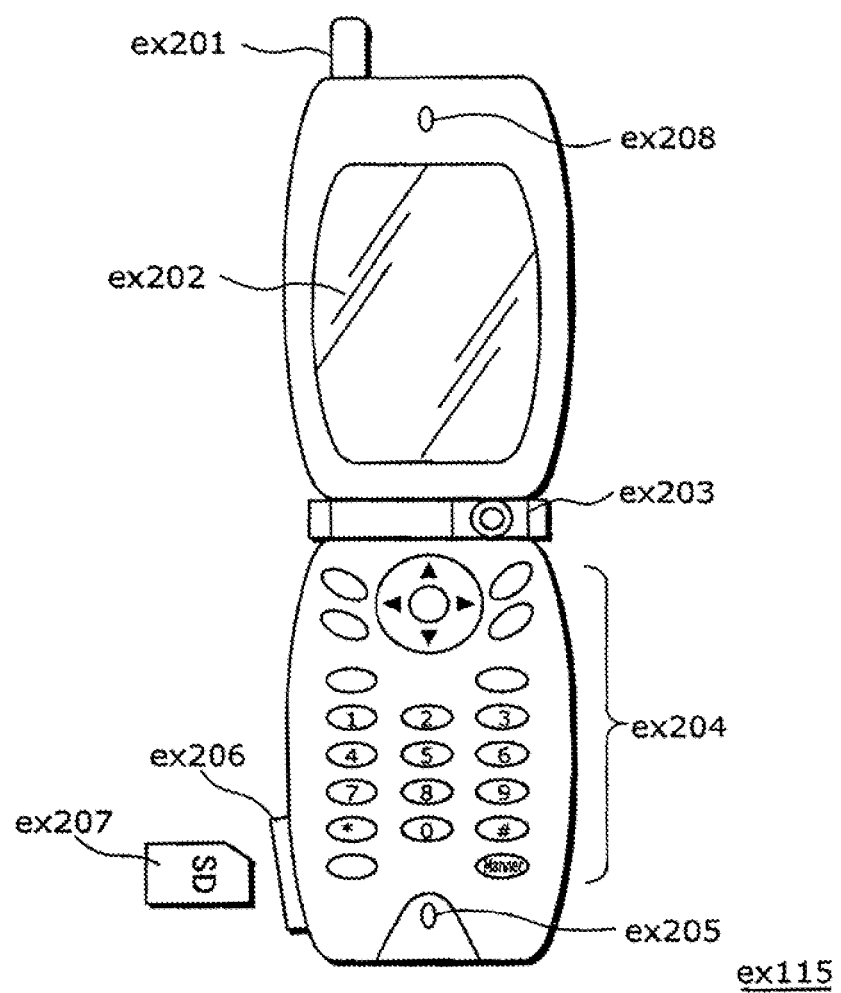
FIG. 11 is a diagram showing an example of a cell phone.

FIG. 11 is a diagram showing the cell phone ex115 that incorporates the moving picture coding method and the moving picture decoding method presented in the above embodiments. The cell phone ex115 has an antenna ex201 for transmitting/receiving radio waves to and from the base station ex110 via radio waves, a camera unit ex203 such as a CCD camera capable of shooting video and still pictures, a display unit ex202 such as a liquid crystal display for displaying the data obtained by decoding video and the like shot by the camera unit ex203 and decoding videos and the like received by the antenna ex201, a main body including a set of operation keys ex204, a voice output unit ex208 such as a speaker for outputting voices, a voice input unit ex205 such as a microphone for inputting voices, a recording medium ex207 for storing coded or decoded data such as data of moving or still pictures shot by the camera, data of received e-mails and moving picture data or still picture data, and a slot unit ex206 for enabling the recording medium ex207 to be attached to the cell phone ex115. The recording medium ex207 stores in itself a flash memory element, a kind of EEPROM (Electrically Erasable and Programmable Read Only Memory) that is an electrically erasable and rewritable nonvolatile memory, in a plastic case such as a SD card.

Next, the cell phone ex115 will be explained with reference to FIG. 12. In the cell phone ex115, a main control unit ex311 for overall controlling the display unit ex202 and each unit of the main body ex204 is configured in a manner in which a power supply circuit unit ex310, an operation input control unit ex304, a picture coding unit ex312, a camera interface unit ex303, an LCD (Liquid Crystal Display) control unit ex302, a picture decoding unit ex309, a multiplexing/demultiplexing unit ex308, a read/write unit ex307, a modem circuit unit ex306 and a voice processing unit ex305 are interconnected via a synchronous bus ex313.

When a call-end key or a power key is turned ON by a user's operation, the power supply circuit unit ex310 supplies to each unit with power from a battery pack so as to activate the digital camera-equipped cell phone ex115 for making it into a ready state.

In the cell phone ex115, the voice processing unit ex305 converts voice signals received by the voice input unit ex205 in conversation mode into digital voice data under the control of the main control unit ex311 comprised of a CPU, a ROM, a RAM and others, the modem circuit unit ex306 performs spread spectrum processing on it, and a transmit/receive circuit unit ex301 performs digital-to-analog conversion processing and frequency transform processing on the data, so as to transmit it via the antenna ex201. Also, in the cell phone ex115, the transmit/receive circuit unit ex301 amplifies a received signal received by the antenna ex201 in conversation mode and performs frequency transform processing and analog-to-digital conversion processing on the data, the modem circuit unit ex306 performs inverse spread spectrum processing on the data, and the voice processing unit ex305 converts it into analog voice data, so as to output it via the voice output unit ex208.

Furthermore, when transmitting an e-mail in data communication mode, the text data of the e-mail inputted by operating the operation keys ex204 on the main body is sent out to the main control unit ex311 via the operation input control unit ex304. In the main control unit ex311, after the modem circuit unit ex306 performs spread spectrum processing on the text data and the transmit/receive circuit unit ex301 performs digital-to-analog conversion processing and frequency transform processing on it, the data is transmitted to the base station ex110 via the antenna ex201.

When the picture data is transmitted in data communication mode, the picture data shot by the camera unit ex203 is supplied to the picture coding unit ex312 via the camera interface unit ex303. When the picture data is not transmitted, it is also possible to display the picture data shot by the camera unit ex203 directly on the display unit 202 via the camera interface unit ex303 and the LCD control unit ex302.

The picture coding unit ex312, which incorporates the moving picture coding apparatus according to the present invention, compresses and codes the picture data supplied from the camera unit ex203 by the coding method employed in the moving picture coding apparatus presented in the above embodiments, so as to convert it into coded picture data, and sends it out to the multiplexing/demultiplexing unit ex308. At this time, the cell phone ex115 sends out the voices received by the voice input unit ex205 while the shooting by the camera unit ex203 is taking place, to the multiplexing/demultiplexing unit ex308 as digital voice data via the voice processing unit ex305.

The multiplexing/demultiplexing unit ex308 multiplexes the coded picture data supplied from the picture coding unit ex312 and the voice data supplied from the voice processing unit ex305 using a predetermined method, the modem circuit unit ex306 performs spread spectrum processing on the resulting multiplexed data, and the transmit/receive circuit unit ex301 performs digital-to-analog conversion processing and frequency transform processing so as to transmit the processed data via the antenna ex201.

When receiving data of a moving picture file which is linked to a Web page or the like in data communication mode, the modem circuit unit ex306 performs inverse spread spectrum processing on the data received from the base station ex110 via the antenna ex201, and sends out the resulting multiplexed data to the multiplexing/demultiplexing unit ex308.

In order to decode the multiplexed data received via the antenna ex201, the multiplexing/demultiplexing unit ex308 separates the multiplexed data into a picture data bit stream and a voice audio data bit stream, and supplies the coded picture data to the picture decoding unit ex309 and the voice data to the voice processing unit ex305 via the synchronous bus ex313.

Next, the picture decoding unit ex309, which incorporates the moving picture decoding apparatus according to the present invention, decodes the picture data bit stream by the decoding method paired with the coding method presented in the above embodiments to generate reproduced moving picture data, and supplies this data to the display unit ex202 via the LCD control unit ex302, and thus moving picture data included in a moving picture file linked to a Web page, for instance, is displayed. At the same time, the voice processing unit ex305 converts the voice data into analog voice data, and supplies this data to the voice output unit ex208, and thus voice data included in a moving picture file linked to a Web page, for instance, is reproduced.

Figure 13:
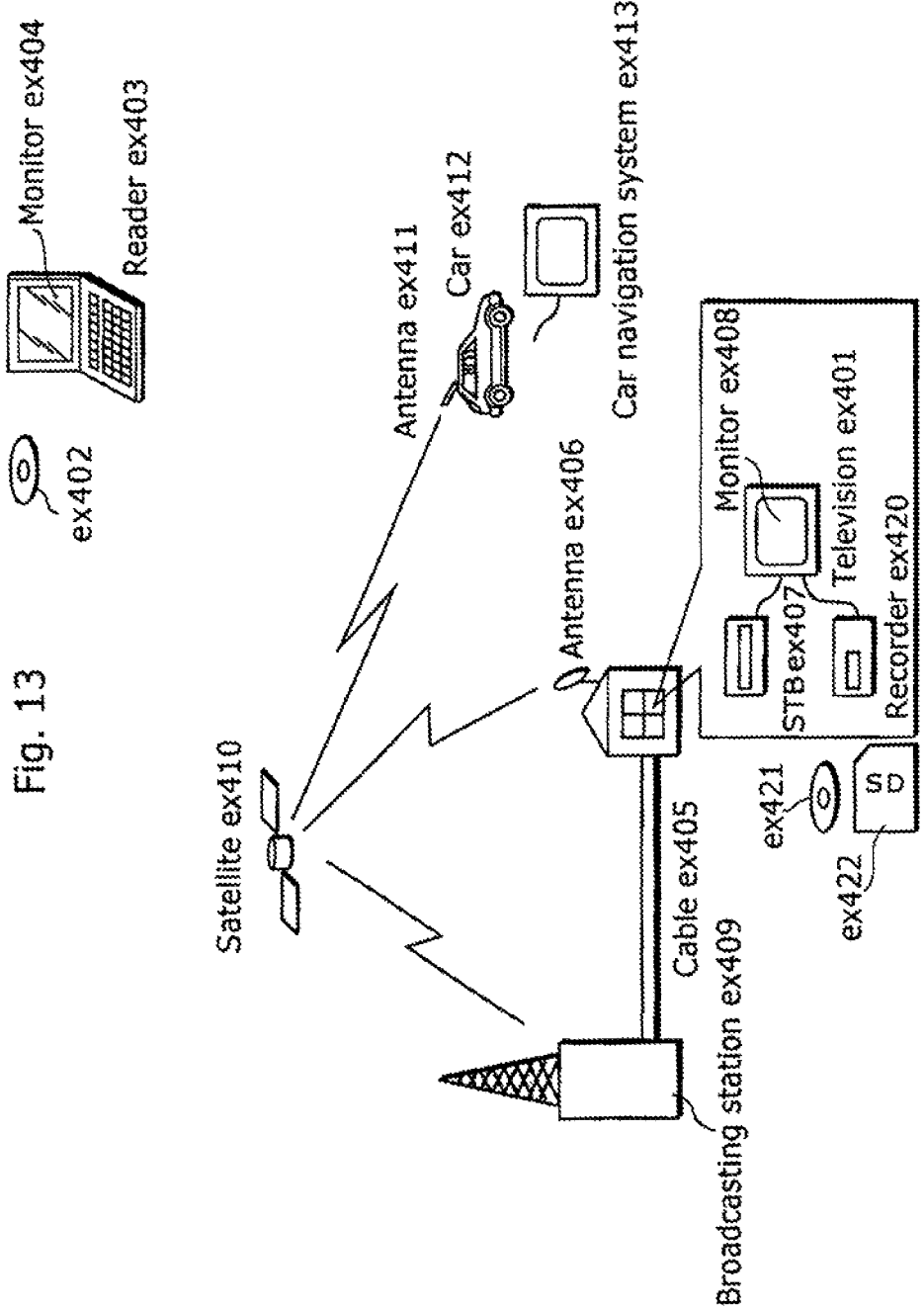
FIG. 13 is a diagram showing an example digital broadcasting system.

Note that the aforementioned system is not an exclusive example and therefore that at least either the moving picture coding apparatus or the moving picture decoding apparatus of the above embodiments can be incorporated into a digital broadcasting system as shown in FIG. 13, against the backdrop that satellite/terrestrial digital broadcasting has been a recent topic of conversation. To be more specific, at a broadcasting station ex409, a coded bit stream of video information is transmitted to a satellite ex410 for communications, broadcasting or the like by radio waves. Upon receipt of it, the broadcast satellite ex410 transmits radio waves for broadcasting, an antenna ex406 of a house equipped with satellite broadcasting reception facilities receives the radio waves, and an apparatus such as a television ex401 and a set top box (STB) ex407 decodes the bit stream and reproduce the decoded data. The moving picture decoding apparatus as shown in the above embodiments can be implemented in the reader ex403 for reading off and decoding the coded bit stream recorded on a storage medium ex402 that is a recording medium such as a CD and a DVD. In this case, a reproduced video signal is displayed on a monitor ex404. It is also conceived to implement the moving picture decoding apparatus in the set top box ex407 connected to a cable ex405 for cable television or the antenna ex406 for satellite/ground-based broadcasting so as to reproduce it on a television monitor ex408. In this case, the moving picture decoding apparatus may be incorporated into the television, not in the set top box. Or, a car ex412 having an antenna ex411 can receive a signal from the satellite ex410, the base station ex107 or the like for reproducing a moving picture on a display device such as a car navigation system ex413.

Furthermore, it is also possible to code an image signal by the moving picture coding apparatus presented in the above embodiments and record the coded image signal in a recording medium. Some examples are a DVD recorder for recording an image signal on a DVD disc ex421, and a recorder ex420 such as a disc recorder for recording an image signal on a hard disk. Moreover, an image signal can be recorded in an SD card ex422. If the recorder ex420 is equipped with the moving picture decoding apparatus presented in the above embodiments, it is possible to reproduce an image signal recorded on the DVD disc ex421 and in the SD card ex422, and display it on the monitor ex408.

Figure 12:
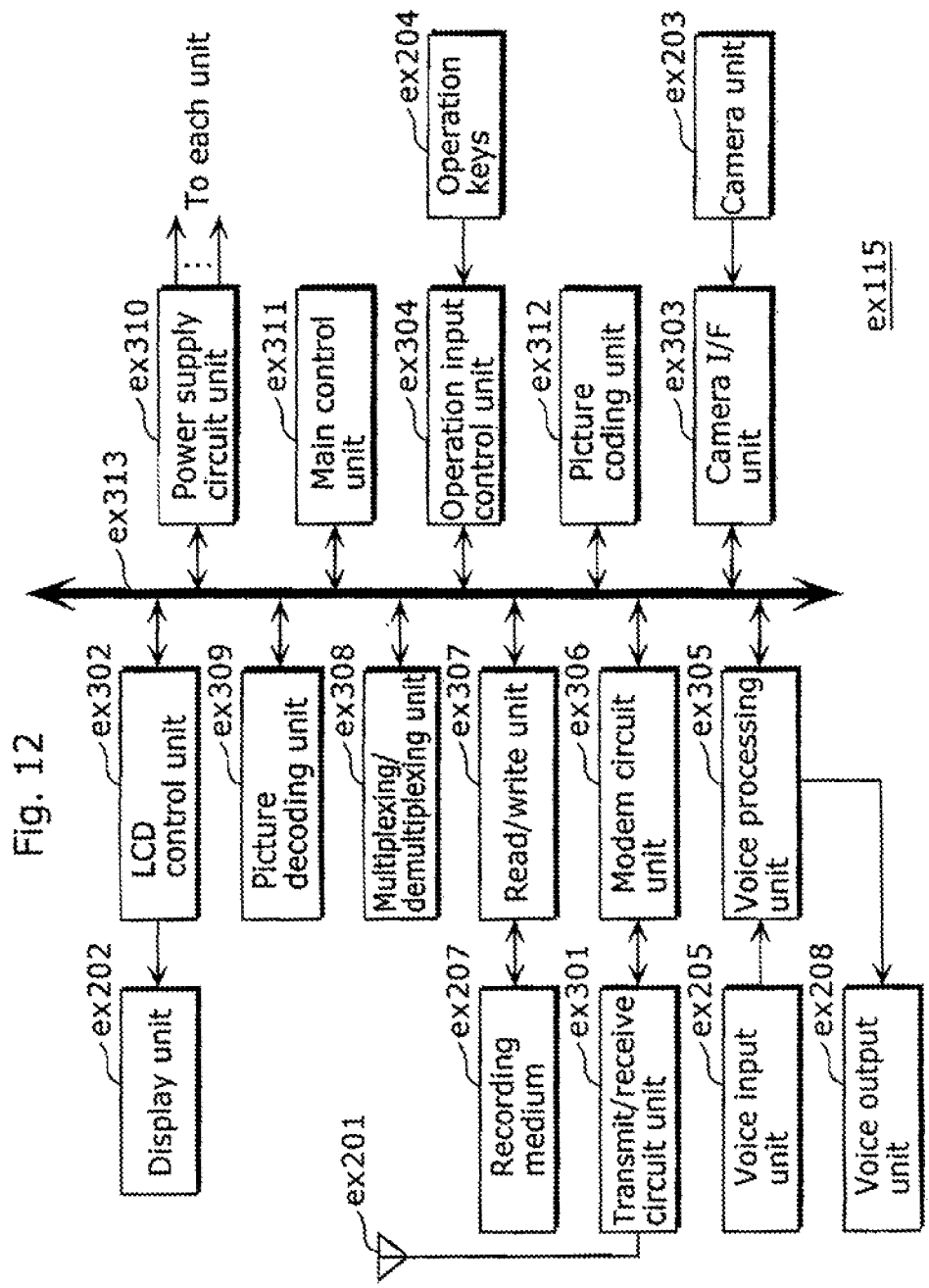
FIG. 12 is a block diagram showing a configuration of the cell phone.

As the configuration of the car navigation system ex413, the configuration without the camera unit ex203 and the camera interface unit ex303, out of the configuration shown in FIG. 12, is conceivable. The same goes for the computer ex111, the television ex401 and others.

Concerning the terminals such as the cell phone ex114, a transmitting/receiving terminal having both an encoder and a decoder, as well as a transmitting terminal only with an encoder and a receiving terminal only with a decoder are possible as forms of implementation.

As stated above, it is possible to employ the moving picture coding method and the moving picture decoding method according to the aforementioned embodiments in any one of the apparatuses and the system described above, and thus the effects explained in the above embodiments can be achieved by so doing.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

As is obvious from the above explanation, the filtering strength determination method according to the present invention is capable of determining, in an optimum manner, a strength of a filter for removing block distortion by filtering decoded image data including high frequency noise around block boundaries, even when prediction coding in which two pictures are referred to is employed. Accordingly, it is possible for moving pictures to be coded in a manner which allows the improvement in the quality of such moving pictures to be decoded. What is more, the filtering strength determination method according to the present invention is applicable to both a moving picture coding apparatus and a moving picture decoding apparatus, offering a significant practical value.

As described above, the filtering strength determination method, the moving picture coding method and the moving picture decoding method according to the present invention are suited as methods for generating a bit stream by coding image data corresponding to each of pictures making up a moving picture and for decoding the generated bit stream on a cell phone, a DVD apparatus, a personal computer and the like.

What is claimed is:

1. A distortion removing method for removing coding distortion between blocks, the coding distortion occurring when both of a current block and a neighboring block are coded by inter picture prediction coding and do not contain coded data, the current block constituting a picture employing prediction coding using two reference pictures, the neighboring block being adjacent to the current block, and the coded data being obtained by coding a coefficient that indicates a spatial frequency component resulting from an orthogonal transformation, the distortion removing method comprising:

determining a filtering strength from among a plurality of filtering strengths including one filtering strength corresponding to no filtering being performed; and removing the coding distortion between the blocks, by performing a filtering with the filtering strength determined in the determining of the filtering strength, wherein in the determining of the filtering strength, when the number of reference pictures referred to by the current block and the number of reference pictures referred to by the neighboring block are not the same, a weakest filtering strength among the plurality of the filtering strengths, excluding the one filtering strength corresponding to no filtering being performed, is selected as the filtering strength, when at least one of a first difference and a second difference is greater than a predetermined value, a weakest filtering strength among the plurality of the filtering strengths, excluding the one filtering strength corresponding to no filtering being performed, is selected as the filtering strength, the first difference between a horizontal element of a moving vector which is included in the current block and a horizontal element of a moving vector which is included in the neighboring block, the second difference between a vertical element of the moving vector which is included in the current block and a vertical element of the moving vector which is included in the neighboring block, and when the number of reference pictures referred to by the current block and the number of reference pictures referred to by the neighboring block are the same, one of (i) a weakest filtering strength among the plurality of the filtering strengths, excluding the one filtering strength corresponding to no filtering being performed, and (ii) the filtering strength corresponding to no filtering being performed is selected as the filtering strength.

\* \* \* \* \*